UNITED STATES PATENT OFFICE.

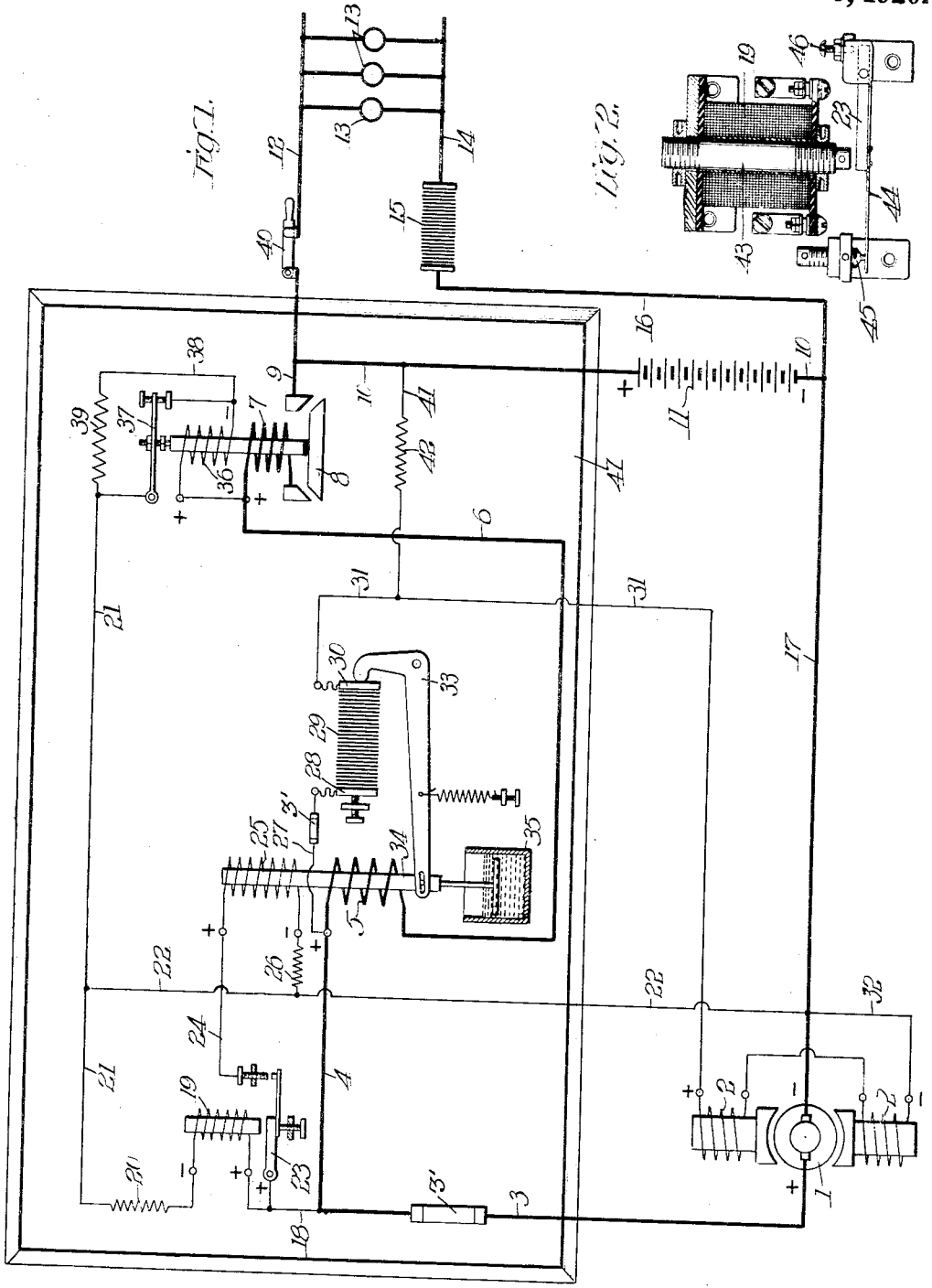

WILLIAM L. BLISS, OF NIAGARA FALLS, NEW YORK.

STOP CHARGE REGULATOR.

1,354,799.  Specification of Letters Patent.  Patented Oct. 5, 1920.

Application filed April 29, 1911. Serial No. 624,110.

*To all whom it may concern:*

Be it known that I, WILLIAM L. BLISS, a citizen of the United States, residing at Niagara Falls, in the county of Niagara and State of New York, have invented new and useful Improvements in Stop Charge Regulators, of which the following is a full, clear, concise, and exact description, reference being had to the accompanying drawing, forming a part of this specification.

My invention relates to a stop charge regulator and to a system employing the same. The regulator is adapted for use in a system wherein a generator and storage battery are employed.

One of the objects of my invention is to provide a system wherein the current delivered by of the generator is automatically regulated and wherein the charging of the storage battery is discontinued when the same approaches a fully charged condition. Another object of the invention is to provide a regulator for performing the functions outlined above. A further object of the invention is to provide an organized structure including a plurality of devices which coöperate with each other in the regulation of a system such as outlined, and which are mounted preferably on a common panel or base to form a substantially unitary structure.

The drawings show a car lighting system which will serve to illustrate the application of my regulator. Of course, the regulator may be used in other systems.

Figure 1 illustrates diagrammatically the car lighting system referred to;

Fig. 2 illustrates the stop charge relay in longitudinal section.

In the system selected for illustration, a variable speed generator is employed, which is adapted to be driven from a car axle. The generator has an armature 1, and a shunt field winding 2. The generator supplies an external circuit across which a storage battery and lamps are connected in parallel branches. When the generator armature is rotating below a certain critical speed the battery carries the lamp load, the generator being disconnected from the battery at this time. When the armature is rotating in excess of this critical speed the generator is connected to the battery and not only carries the lamp load but charges the battery, as hereinafter described. The external circuit of the generator is through conductors 3, 4, series coil 5, conductor 6, release coil 7, automatic switch 8, conductor 9, and dividing through conductor 10 and storage battery 11 and through lamp circuit conductor 12, lamps 13, return conductor 14, variable resistance 15 and conductor 16 to the juncture of conductors 16, 10, and returning through conductor 17 to the generator.

A stop charge relay is provided which is connected across the generator terminals. The relay closes when the voltage increases to a certain point and thereby permits the energization of a voltage responsive coil, which acts cumulatively with the series regulating coil 5 to effect a reduction in battery charging current. The shunt circuit around the generator in which the relay is connected includes conductor 18, shunt coil 19, resistance 20, conductor 21, and return conductor 22 to the generator. Another shunt circuit around the generator extends from conductor 18, pivoted contact 23, conductor 24, shunt regulating coil 25 and resistance 26 to conductor 22 and thence returning to the generator. As illustrated in the drawing, the pivoted lever 23 is in its lowermost position and hence this latter circuit is open until said lever is drawn upwardly by the shunt coil or stop charge relay coil 19, after which the shunt regulating coil 25 acts cumulatively with the series regulating coil 5 and reduces the generator current.

The output of the generator is regulated by a variable pressure rheostat 29 which is connected in the generator shunt field circuit. Said circuit extends through conductors 3, 4, 27, and through the variable resistance device consisting of an adjustable block 28, carbon plates 29, movable block 30, conductor 31, field winding 2, and conductor 32 returning to the armature.

The means for varying the pressure of the carbon resistance includes a pivoted bell crank lever 33 bearing at one end against the movable block 30 and having its other end secured to the plunger 34 controlled by the shunt winding 25 and the series winding 5, as will be hereinafter described. The dash pot 35 is provided to steady the action of the plunger.

The automatic switch 8 is closed upon a predetermined rise in voltage by the lifting coil 36 arranged in a shunt circuit across the generator terminals and extending from conductor 6, through coil 36, through the pivoted contact 37 when said contact is in its lowermost or closed position, and through conductor 38, resistance 39, when the contact 37 is in its upper or open circuited position, which occurs when the automatic switch is closed, and thence through conductors 21 and 22 to the generator. The hand switch 40 is illustrated as closing the circuit of the lamps. A conductor 41 and resistance 42 provide a path for battery current through conductor 31 and generator field 2, returning to the battery by conductors 32, 17, 10, whereby an initial excitation of the generator field in the proper direction is always assured whether the lamp circuit is connected with the battery, or not. Fuses 3' are illustrated in conductors 3 and 37.

The operation of the system when the generator is driven from the car-axle is as follows: With the generator at rest, the position of the various parts is as shown in the drawings, the automatic switch being open. The storage battery carries the lamp load. The proper field excitation of the generator is assured by the small battery current which flows through the generator field coils. When the car, on which the generator is mounted, begins to move, the generator armature rotates, and as its speed of rotation increases the voltage increases until at a predetermined voltage the lifting coil 36 closes the automatic switch 8 thereby completing the circuit from the generator to the battery and lamps. The current flowing through the release coil 7 aids the coil 36 in holding the automatic switch closed.

For the sake of illustration, assume that the battery has thirty-two cells. This would supply what is known as a 60 volt system. Under these circumstances the automatic switch would close when the generator voltage reaches about 64 volts. At this point the battery would float across the line. Upon further increase of speed and consequently voltage, the generator will charge the battery and carry the lamp load, if any lamps happen to be in circuit at the time. The resistance 15 illustrates diagrammatically any form of lamp regulator adapted to prevent an excessive voltage from being impressed on the lamp circuit.

The operation of the generator regulator is as follows: The plunger 34 is normally in its lowermost position due to its weight assisted by a spring and accordingly the resistance of the field circuit is a minimum. Upon increase of current in the series coil 5, said plunger is raised and releases the pressure on the series of carbon plates 29 thereby increasing the resistance in series with the generator field. Upon decrease in current the plunger lowers and increases the pressure on the series of carbon plates thereby decreasing the resistance in series with the generator field. In this way the generator field is automatically regulated and the voltage of the generator is either raised or lowered to increase or decrease the current delivered by the generator. The main function of the regulator during the normal battery charging period is to confine the generator current within a predetermined limit regardless of increases in the speed of armature rotation above the desired value, due to excessive train speeds. It will be seen that the regulator tends to maintain constant the number of ampere turns effective upon the plunger 34. During the operation above described, the voltage coil 25 has not been energized, as it is open circuited by the lever 23.

When the battery approaches a fully charged condition, the counter-electromotive force developed thereby, rises decidedly, and accordingly the tendency of the current flowing from series coil 5 is to decrease. The tendency of the regulator, unless counteracted, would be to increase the generator field strength and raise the generator voltage so as to maintain the current in the series coil at the same value and thereby meet the new condition imposed by the increased resistance of the circuit. As the battery is already about charged, this continuance of the full charging current would be injurious. In order to stop the charge, therefore, when the battery becomes approximately fully charged, the stop charge relay coil 19 is adjusted to respond to this increased voltage of the system, and raise the pivoted lever 23, thereby connecting the coil 25 in the shunt circuit across the mains. The relay closes when the generator reaches about 86 volts. The regulating resistance 29 is immediately increased to reduce the generator voltage and hence the energization of the series coil 5, and thereby tends to maintain constant the number of ampere turns effective upon the plunger 34. As a result the current delivered to the battery is cut down immediately to substantially zero. The regulator is preferably so designed and adjusted that the automatic switch falls open as soon as the relay closes, thereby disconnecting the generator from the battery. Upon continued high speed of rotation of the generator armature or upon still further increase in speed of rotation, the shunt coil 25 regulates the generator to hold down its voltage. If desired the regulator may be so designed that the automatic switch will remain closed when the stop charge relay closes, and just enough current will be supplied to the main circuit to carry the lamp load with the battery floating across the line. While the automatic switch is closed, the resistance 39 is in series with the lifting coil 36, thereby weakening the same and facilitating the opening of the switch when the release coil 7 opposes the lifting coil 36 during the discharge of the battery. When the automatic switch is open the resistance 39 is short circuited. The resistance 39 also prevents undue heating of the lifting coil 36 whereby its resistance is not varied to such an extent as to cause the automatic switch to close under different voltage conditions at different times. The resistance 39 also assures the opening of the automatic switch 8 before the opening of the relay contact 23 in cases where the automatic switch is not designed to drop open immediately upon the closing of the stop charge relay. The advantage of connecting the relay coil 19 between the generator and the automatic switch instead of beyond the switch is to insure a minimum resistance in the generator field circuit when the generator begins to excite itself. With the relay coil 19 connected beyond the automatic switch it would be subjected to battery voltage permanently and thereby introduce unnecessary resistance in the generator field circuit by causing the energization of the voltage coil which would relax the pressure on the variable carbon resistance.

Inasmuch as the car on which the generator is mounted may run in either direction, it is necessary to provide some form of pole changing device to insure proper polarity of the circuit leading from the generator to insure charging the battery in the proper direction. As the pole changer forms no part of the present invention it is not illustrated.

The device shown in Fig. 2 illustrates the details of the stop charge relay. The relay coil 19 is provided with an adjustable core 43 for varying the air gap between said core and the pivoted armature 23. The armature is provided with a resilient extension or contact member 44 which coöperates with the adjustable stationary contact 45. The downward movement of the pivoted armature 23 is limited by the adjustable screw 46. When the armature is attracted the circuit is closed with a wiping action of the contacts.

The various devices comprising the regulator are all preferably mounted on a supporting panel 47 located in any convenient part of the car, although I do not limit myself to this common mounting. By virtue of the features described, the regulator is not deranged by the vibration and jarring to which it is necessarily subjected.

I do not desire to limit myself to the various embodiments described herein, but desire to cover any suitable means for accomplishing the desired results and falling within the scope of the appended claims.

I claim as my invention—

1. An electrical system comprising a generator, a storage battery, a circuit connecting said generator to said battery, an excitation circuit connecting said battery to the field circuit of said generator for supplying initial excitation for said generator, a regulator for said generator comprising a variable resistance, means for varying said resistance, a current coil adapted to control said means, and a stop charge relay for rendering effective said voltage coil to cut off the charging current.

2. An electrical system comprising a generator, a storage battery, a circuit connecting said generator to said battery, an excitation circuit connecting said battery to the field circuit of said generator for supplying initial excitation for said generator, a stop charge regulator for said generator comprising a variable resistance, said regulator comprising a current coil and a voltage coil, said voltage coil being normally inert, said current coil being normally energized and adapted to control said resistance to regulate for constant current, and a stop charge relay effective upon predetermined rise in voltage to connect said voltage coil in effective circuit to render said voltage coil operative to predominate in the control of said resistance.

3. In a car lighting system, a generator having a shunt field circuit, a variable pressure rheostat connected in said shunt field circuit for controlling the generator output, an external circuit for said generator, a storage battery connected across said external circuit and a circuit connection from said storage battery to a point between said variable pressure rheostat and the generator field winding, said connection including an excitation resistance whereby a small initial excitation battery current may traverse said generator field winding without traversing said variable pressure rheostat.

In witness whereof, I have hereunto subscribed my name in the presence of two witnesses.

WILLIAM L. BLISS.

Witnesses:
 GEO. B. JONES,
 A. H. ACKERMANN.